(12) United States Patent
Pudvah et al.

(10) Patent No.: US 9,777,643 B2
(45) Date of Patent: *Oct. 3, 2017

(54) ACTUATOR MOUNTED TO TORQUE BOX

(71) Applicant: United Technologies Corporation, Hartford, CT (US)

(72) Inventors: Bernard W. Pudvah, Portland, CT (US); Eugene C. Gasmen, Rocky Hill, CT (US); Stanley Wiecko, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/684,689

(22) Filed: Apr. 13, 2015

(65) Prior Publication Data

US 2015/0219017 A1    Aug. 6, 2015

Related U.S. Application Data

(63) Continuation of application No. 13/485,325, filed on May 31, 2012, now Pat. No. 9,039,355.

(51) Int. Cl.
*F01D 17/10* (2006.01)
*F02C 9/22* (2006.01)
(Continued)

(52) U.S. Cl.
CPC .............. *F02C 9/22* (2013.01); *F01D 17/162* (2013.01); *F04D 29/563* (2013.01); *F16H 21/44* (2013.01);
(Continued)

(58) Field of Classification Search
CPC ...... F01D 17/167; F01D 17/162; F04D 29/46; F04D 29/56; F04D 29/563; F02C 9/22; F05D 2260/31
(Continued)

(56) References Cited

U.S. PATENT DOCUMENTS 3,487,992 A    1/1970 Pineda
4,049,360 A    9/1977 Snell
(Continued)

FOREIGN PATENT DOCUMENTS

EP    0235073 A2    9/1987

OTHER PUBLICATIONS

Extended European Search Report for European Application No. 13798128.8, dated Feb. 16, 2016, 8 pages.
(Continued)

*Primary Examiner* — Craig Kim
*Assistant Examiner* — Jason Fountain
(74) *Attorney, Agent, or Firm* — Kinney & Lange, P.A.

(57) ABSTRACT

An actuator system mounted to a gas turbine engine that communicates mechanical power for positioning variable guide vanes within the gas turbine engine. The actuator system includes a torque box having components for communicating mechanical power to the variable guide vanes for positioning the vanes and an actuator mechanically coupled to provide mechanical power to the components of the torque box used to communicate the provided mechanical power to the inlet guide vanes. The actuator is mounted to the torque box via an elongate fastener extending in one direction and another elongate fastener extending in another direction.

20 Claims, 4 Drawing Sheets

(51) Int. Cl.
  *F01D 17/16* (2006.01)
  *F16H 21/44* (2006.01)
  *F04D 29/56* (2006.01)

(52) U.S. Cl.
  CPC .. *F05D 2250/312* (2013.01); *F05D 2250/313* (2013.01); *F05D 2260/31* (2013.01); *F05D 2260/56* (2013.01); *Y10T 74/18888* (2015.01); *Y10T 74/20012* (2015.01)

(58) Field of Classification Search
  USPC .................. 415/155, 150, 148, 159, 160
  See application file for complete search history.

(56) References Cited

U.S. PATENT DOCUMENTS

| | | |
|---|---|---|
| 4,279,568 A | 7/1981 | Munroe |
| 4,295,784 A | 10/1981 | Manning |
| 4,810,165 A | 3/1989 | Greune et al. |
| 5,549,448 A | 8/1996 | Langston |
| 6,551,057 B1 * | 4/2003 | Haaser ................. F01D 17/162 415/119 |
| 6,769,868 B2 | 8/2004 | Harrold |
| 6,821,084 B2 | 11/2004 | Bathori et al. |
| 9,039,355 B2 * | 5/2015 | Pudvah ................. F01D 17/162 415/150 |
| 2004/0022624 A1 | 2/2004 | Harrold |
| 2005/0129510 A1 | 6/2005 | Raine et al. |
| 2008/0273965 A1 | 11/2008 | Rajamani et al. |
| 2009/0162192 A1 | 6/2009 | McCaffrey |
| 2009/0226305 A1 | 9/2009 | Wong et al. |
| 2010/0158663 A1 | 6/2010 | Colotte et al. |
| 2010/0278639 A1 | 11/2010 | Hood et al. |
| 2012/0034080 A1 | 2/2012 | Agrawal et al. |
| 2014/0010637 A1 | 1/2014 | Pudvah |

OTHER PUBLICATIONS

International Search Report and Written Opinion dated Sep. 12, 2013 from PCT Serial No. PCT/US2013/043119, 10 Pages.

* cited by examiner

ACTUATOR MOUNTED TO TORQUE BOX

CROSS-REFERENCE TO RELATED APPLICATION(S)

This application is a continuation of U.S. patent application Ser. No. 13/485,325, filed on May 31, 2012, and entitled "ACTUATOR MOUNTED TO TORQUE BOX," the disclosure of which is incorporated by reference in its entirety.

BACKGROUND

The present invention is related to gas turbine engines, and in particular to actuators for positioning inlet guide vanes and/or rotatable guide vanes.

Gas turbine engines rely on rotating and stationary components to effectively and efficiently control the flow of air through the engine. Rotating components include rotor blades employed in compressor and turbine sections for compressing air and extracting energy from air after combustion. Stationary components include vanes placed in the airflow to aid in directing airflow. By varying the position of the vanes (i.e., rotating them to vary the profile provided to the airflow), airflow characteristics can be optimized for various operating conditions.

The mechanism for providing precise, controlled, and uniform actuation of the vanes is a linear actuator connected to the plurality of vanes located circumferentially around the engine via a series of linkages. The actuator is typically mounted to the exterior of the engine case, and communicates power to the series of linkages via a bell crank or similar mechanical device mounted on a torque box. Installation and alignment of the actuator relative to the bell crank is critical to achieving a desired positioning of the vanes. However, factors such as thermal growth during various flight conditions can adversely affect the alignment of the actuator with the bell crank, which results in errors in between the desired position of inlet guide vanes and the actual position of the inlet guide vanes.

SUMMARY

An actuation system mounted to a gas turbine engine that communicates mechanical power for positioning inlet guide vanes within the gas turbine engine. The actuation system includes a torque box having components for communicating mechanical power to position the inlet guide vanes and an actuator mechanically coupled to provide mechanical power to the components of the torque box. The actuator is mounted to the torque box via an elongate fastener extending in one direction and another elongate fastener extending in another direction.

DETAILED DESCRIPTION

Figure 1:
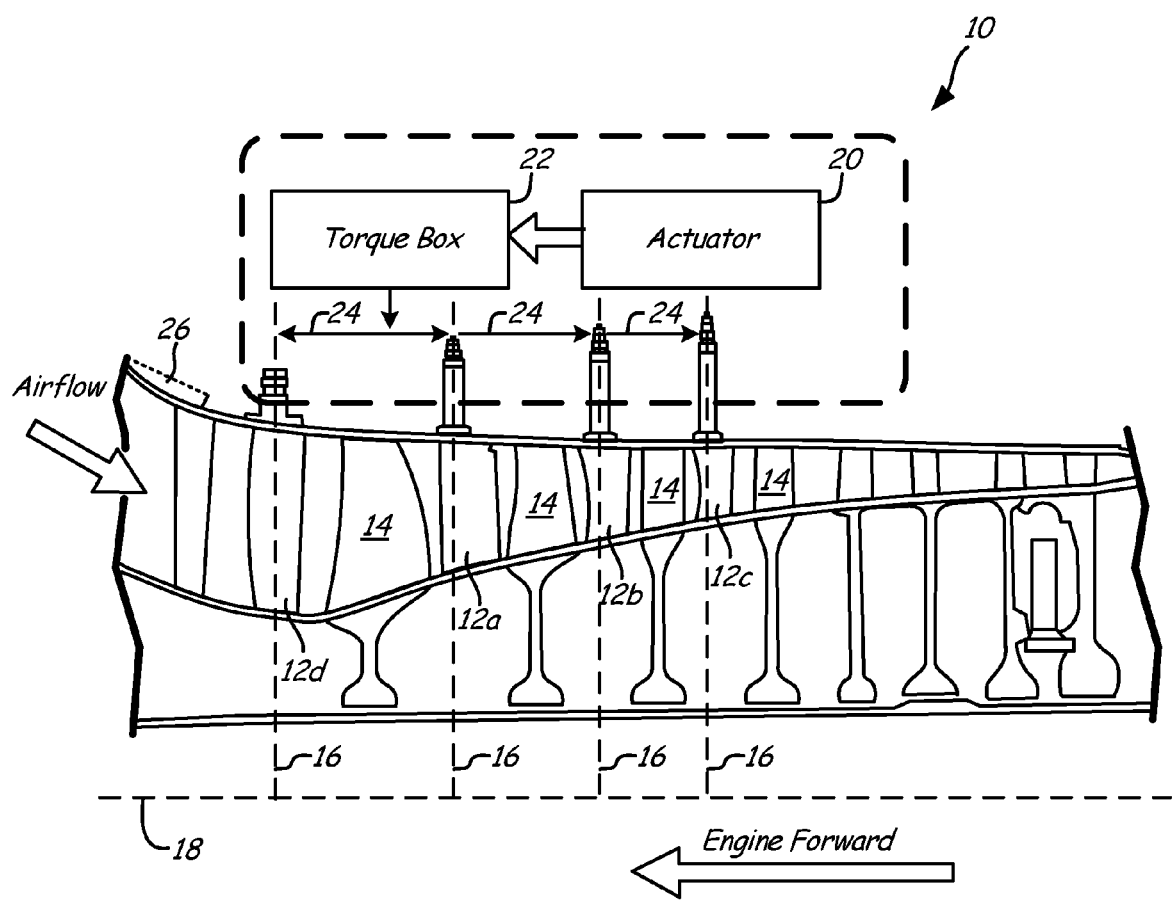
FIG. 1 is a cross-sectional view of a gas turbine engine according to an embodiment of the present invention.

FIG. 1 is a cross-sectional view of a compressor section of gas turbine engine 10 according to an embodiment of the present invention, although the principles of the present invention may be applied to a turbine section of gas turbine engine 10 as well. In the cross-sectional view shown in FIG. 1, gas turbine engine 10 includes a plurality of stationary variable guide vanes (VGV) 12 and a plurality of rotating blades 14. With respect to stationary VGVs 12, each is rotatable about an axis 16 that is substantially perpendicular with engine centerline axis 18. The performance of gas turbine engine 10 is modified, in part, by adjusting the position of stationary VGVs 12 to selectively vary airflow characteristics of the engine.

Mechanical force used to change the position of VGVs 12 is provided by actuator 20, and communicated via torque box 22 and a plurality of arms 24 to stationary VGVs 12. Actuator 20 and torque box 22 are positioned radially outward of engine case 26. As discussed in more detail below, torque box 22 is mechanically attached to engine case 26, while actuator 20 is mechanically coupled to torque box 22. A benefit of connecting actuator 20 to torque box 22, rather than directly to engine case 26 is improved alignment between actuator 20 and torque box 22. In particular, when both the torque box and actuator are attached to the engine case, tolerances associated with attachment of both the torque box and actuator to the engine case, coupled with thermal growth issues can negatively impact the alignment between the two, which results in positioning errors in the stationary VGVs.

Figure 2:
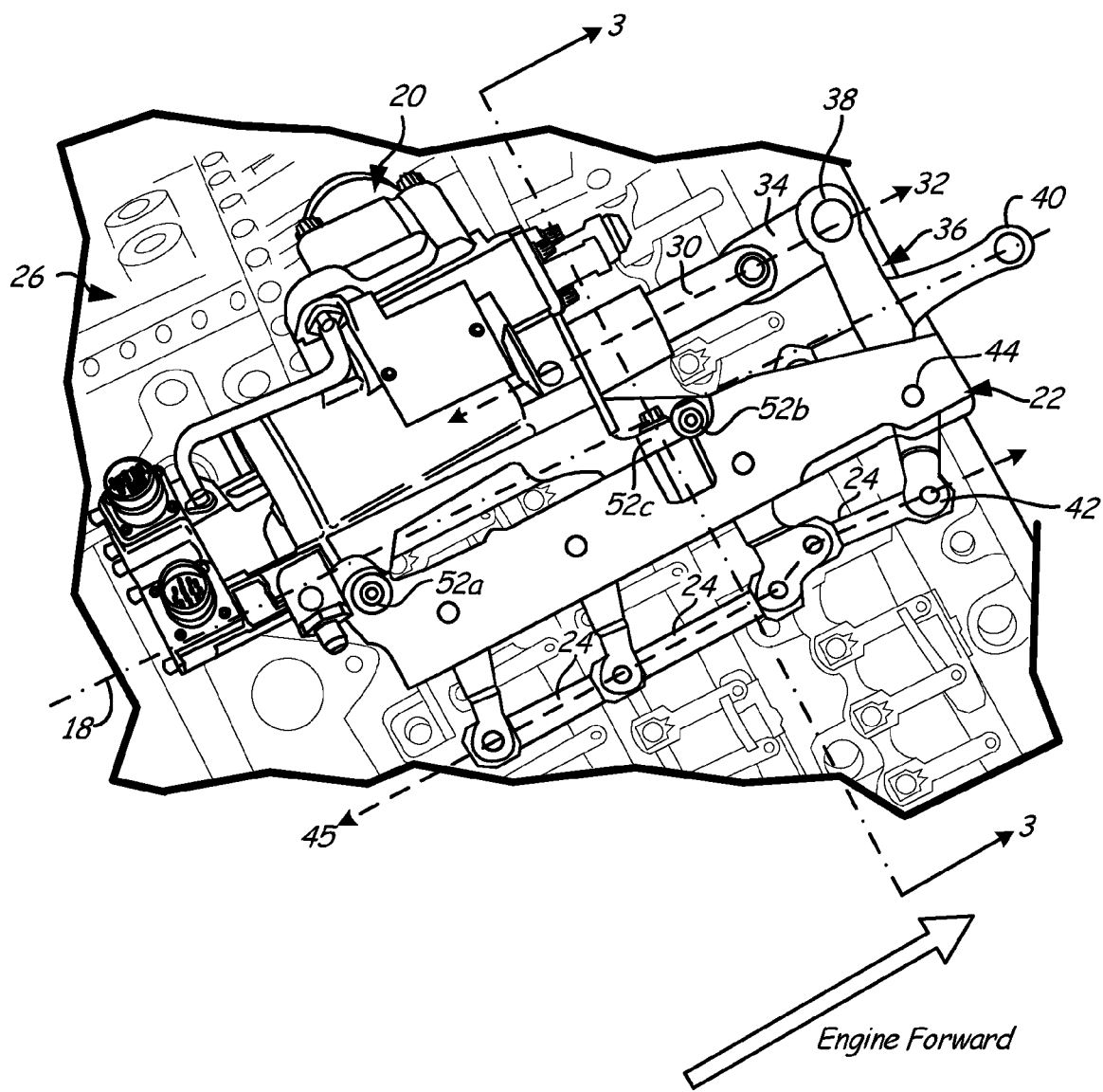
FIG. 2 is a top-view of an actuator and torque box positioned above an engine case according to an embodiment of the present invention.

FIG. 2 is a top-view of actuator 20 and torque box 22 positioned above engine case 26 according to an embodiment of the present invention. Actuator 20 is a linear actuator that provides mechanical force in the direction indicated by line 32. Actuator arm 30 is connected to dog-bone arm 34, which in turn is connected to bell crank 36. In the embodiment shown in FIG. 2, bell crank 36 includes first end 38, second end 40, and third end 42. First end 38 is mechanically coupled to dog-bone arm 34. Second end 40 is connected to a first stage synchronizing ring (not shown). Third end 42 is mechanically coupled to arm 24. Bell crank 36 is supported by and pivotally connected to torque box 22 at pivot point 44. Mechanical force applied by actuator 20 in the direction indicated by line 32 results in bell crank 36 pivoting about point 44, resulting in mechanical force being applied by third end 42 to arms 24 in a direction indicated by arrow 45, in a direction opposite to the direction of first end 38. Conversely, mechanical force applied by actuator 20 in a direction opposite of line 32 results in mechanical force being applied by third end 42 to arms 24 in a direction opposite that indicated by arrow 45.

A plurality of synchronizing rings (not shown) are positioned circumferentially around engine case 26, including at least one synchronizing ring located forward of bell crank 36 attached to actuator 20 via second end 40 of bell crank 36. Each synchronizing ring is associated with the VGVs 12a, 12b, and 12c, respectively, shown in FIG. 1. Mechanical motion provided via arms 24 in a direction indicated by arrow 45 is communicated to the synchronizing rings, which results in the synchronizing rings moving in a circumferential direction that results in positioning of VGVs 12a, 12b, and 12c.

Actuator 20 is mechanically fixed to torque box 22. In the embodiment shown in FIG. 2, three bolts 52a, 52b, and 52c attach actuator 20 to torque box 22. Bolts 52a and 52b extend radially into torque box 22, while bolt 52c extends tangentially (i.e., at an angle perpendicular to bolts 52a and 52b) into torque box 22. Bolt 52b is located forward of bolt 52a, and may be located at a radial height different than that of bolt 52a.

Figure 3:
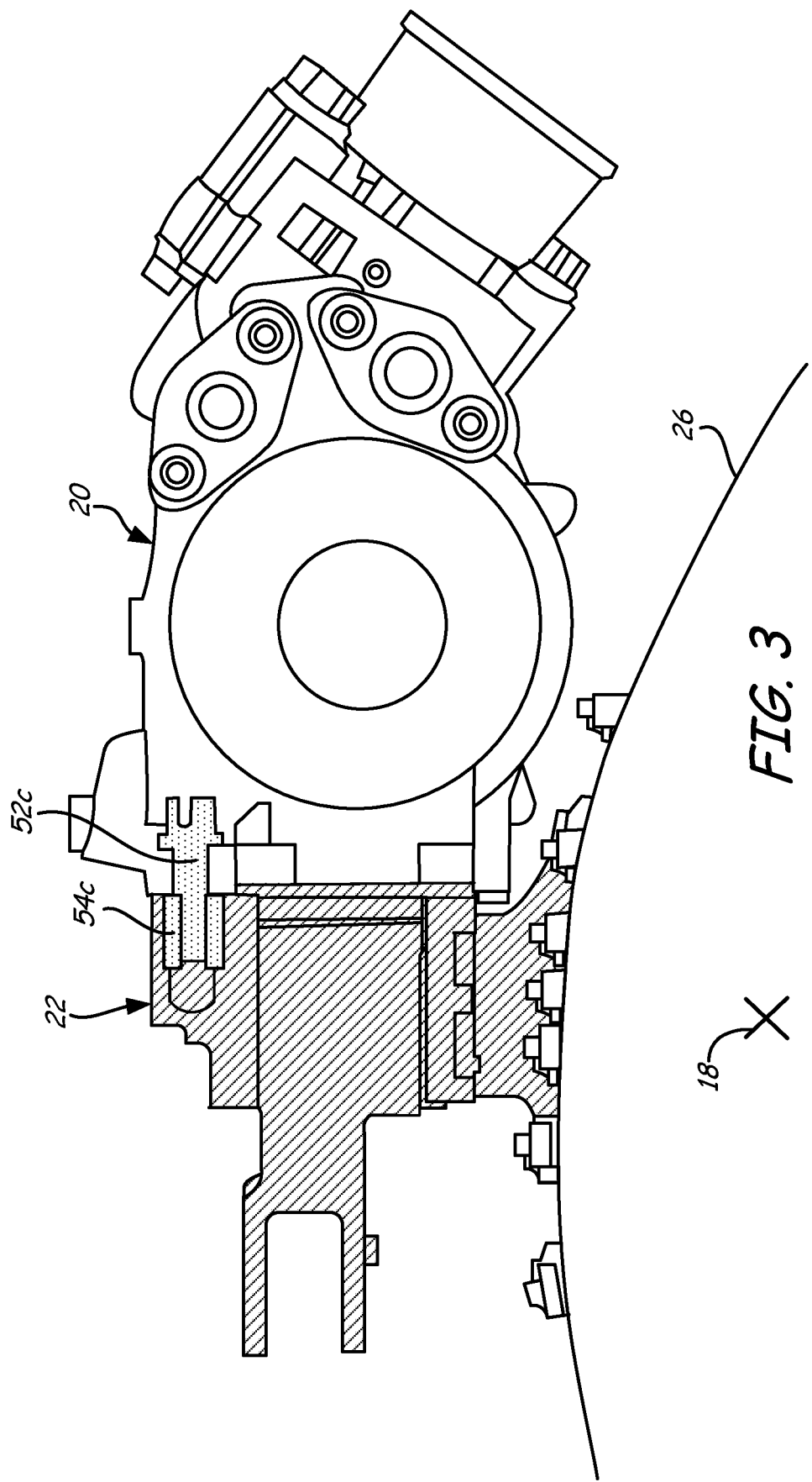
FIG. 3 is a side view illustrating the attachment of the actuator to the torque box according to an embodiment of the present invention.

FIG. 3 is a cross-sectional view taken along line 3-3 shown in FIG. 2, illustrating the attachment of actuator 20 to torque box 22 according to an embodiment of the present invention. In the embodiment shown in FIG. 3, actuator 20 is located adjacent torque box 22. Bolt 52c is visible, and illustrates attachment of actuator 20 to torque box 22. In addition, the cross-sectional view shown in FIG. 3 illustrates the placement of helical coil insert 54c within torque box 22 to secure bolt 52c.

In addition, the embodiment shown in FIG. 3 illustrate the placement of actuator 20 adjacent to torque box 22, while maintaining the placement of actuator 20 proximate to engine case 26 (as opposed to locating actuator 20 radially outward of torque box 22). This decreases the cross-sectional profile of actuator 20 and torque box 22, and is beneficial in decreasing the overall size of the engine.

Figure 4:
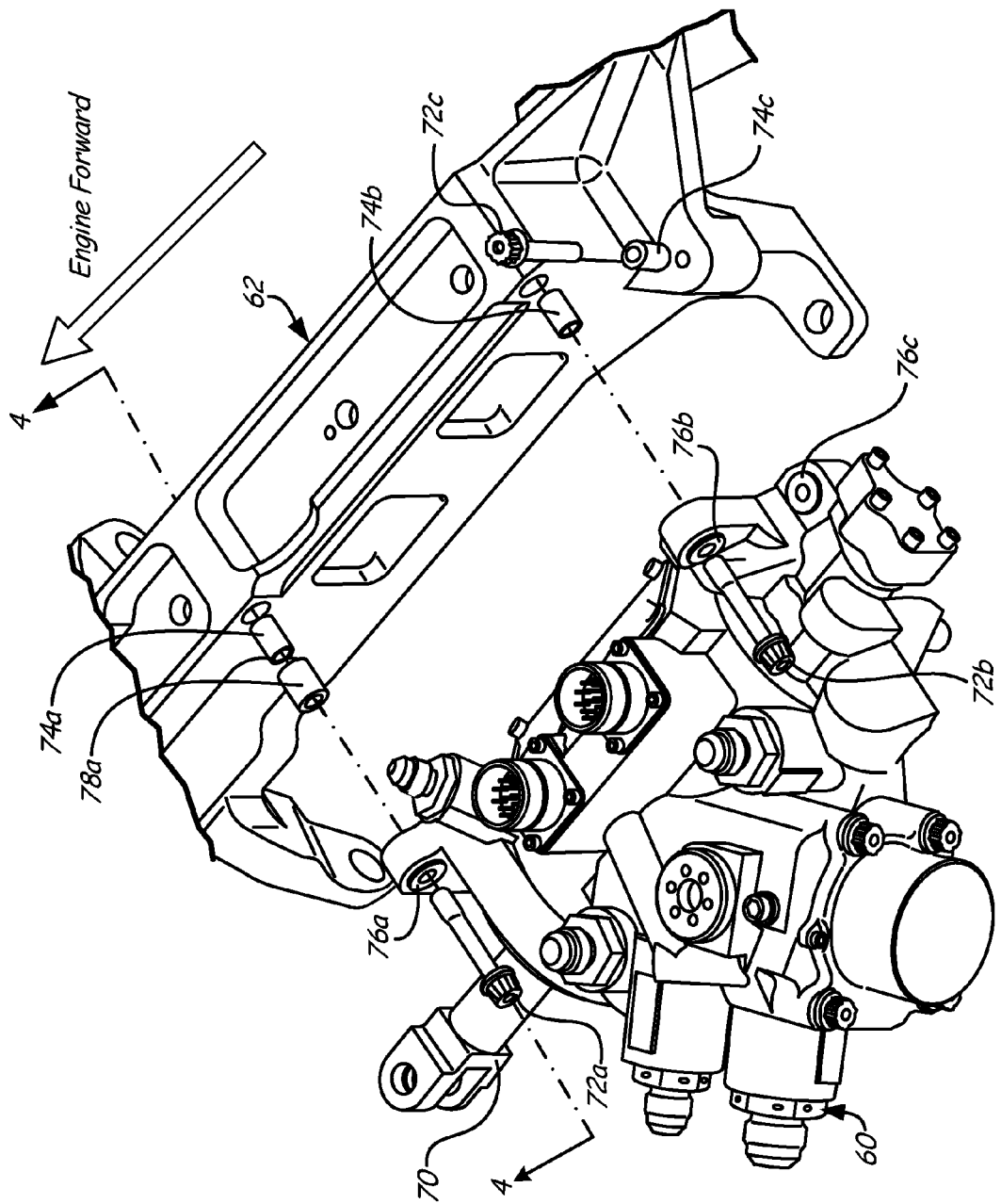
FIG. 4 is an isometric view illustrating the attachment of an actuator to the torque box according to another embodiment of the present invention.

FIG. 4 is an isometric view illustrating the attachment of actuator 20 to torque box 22 according to another embodiment of the present invention. In the embodiment shown in FIG. 4, actuator 60 is mechanically coupled to torque box 62 by three bolts 72a, 72b, and 72c. However, in the embodiment shown in FIG. 4, bolts 72a and 72b are directed tangentially through actuator 60 to torque box 62, while only bolt 72c is directed radially through actuator 60 to torque box 62. In addition, helical coil inserts 74a, 74b and 74c and washers 76a, 76b, and 76c are shown. Helical coil inserts 74a-74c are provided in the bolt holes to lock bolts 72a-72c in place once installed (i.e., prevent loosening rotation of the bolts). Washers 76a-76c are located adjacent to actuator 60 to prevent damage to the surface of actuator 60.

Bolts 72a and 72b secure actuator 60 to torque box 62 in a direction tangential to a circumference associated with the engine centerline axis 18. Bolt 72c secures actuator 60 to torque box 62 in a radial direction. Bolts 72a and 72b are generally aligned with one another, but perpendicular to bolt 72c. The combination of bolts 72a, 72b and 72c secure actuator 20 to torque box 22.

In addition, bolt 72c is located on a plane radially inward of torque box 62 with bolts 72a and 72b tangential to the torque box 22. The location of bolt 72c relative to bolts 72a and 72b prevents axial bending or flexing of actuator 60 relative to torque box 62, thereby improving alignment between actuator 60 and torque box 62. In addition, locating sleeve 78a is employed in conjunction with bolt 72a, to align actuator 60 with torque box 62.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuator system comprising:
 a torque box having components for communicating mechanical power to variable guide vanes for positioning, wherein the torque box is mounted to an exterior side of an engine case associated with a gas turbine engine; and
 an actuator mechanically coupled to provide mechanical power to the components of the torque box used to communicate the provided mechanical power to the variable guide vanes, wherein the actuator is mounted directly to the torque box via a first elongate fastener extending in a first direction between a first hole in the actuator and a second hole in the torque box and a second elongate fastener extending in a second direction that is different from the first direction between a third hole in the actuator and a fourth hole in the torque box.

2. The actuator system of claim 1, wherein the first direction is perpendicular to the second direction.

3. The actuator system of claim 2, wherein the first direction extends radially from a centerline axis of the gas turbine engine and the second direction is tangential to the centerline axis.

4. The actuator system of claim 1, wherein the actuator is further mounted directly to the torque box via a third elongate fastener extending in one of the first direction and the second direction.

5. The actuator system of claim 4, wherein the third elongate fastener is attached to the torque box at a location radially inward of the first and/or second elongate fasteners.

6. The actuator system of claim 4, wherein the first direction is perpendicular to the second direction.

7. The actuator system of claim 5, wherein the first direction extends radially from a centerline axis of the gas turbine engine and the second direction is tangential to the centerline axis.

8. The actuator system of claim 1, wherein the actuator is a linear actuator that communicates mechanical power in a direction parallel with an engine centerline axis.

9. The actuator system of claim 8, wherein the torque box includes a bell crank having at least a first end and a second end, wherein the bell crank is pivotally attached to the torque box at a pivot point located between the first end and the second end.

10. The actuator system of claim 9, wherein the first end of the bell crank is attached to the linear actuator, and the second end of the bell crank is attached to linkages for communicating mechanical power to the variable guide vanes.

11. A gas turbine engine comprising:
 an engine case;
 a compressor and/or turbine stage having at least a first plurality of stationary variable guide vanes (VGVs) circumferentially spaced around the gas turbine engine radially inward of the engine case, and a second plurality of stationary variable guide vanes (VGVs) circumferentially spaced around the gas turbine engine radially inward of the engine case, wherein the first plurality of VGVs are axially spaced from the second plurality of VGVs;
 a torque box mounted to the engine case that includes components for communicating mechanical power to the first plurality of VGVs and the second plurality of VGVs; and
 a linear actuator mounted directly to the torque box via a first elongate fastener extending in a first direction between a first hole in the actuator and a second hole in the torque box and a second elongate fastener extending in a second direction that is different than the first direction between a third hole in the actuator and a fourth hole in the torque box and coupled to provide mechanical force to the components of the torque box to selectively position the first plurality of VGVs and the second plurality of VGVs.

12. The gas turbine engine of claim 11, wherein the first direction is perpendicular to the second direction.

13. The gas turbine engine of claim 12, wherein the first direction extends radially from a centerline axis of the gas turbine engine and the second direction is tangential to the centerline axis.

14. The gas turbine engine of claim 13, wherein the torque box is mounted to an exterior side of an engine case associated with the gas turbine engine.

15. The gas turbine engine of claim 11, wherein the actuator is further mounted directly to the torque box via a third elongate fastener extending in one of the first direction and the second direction.

16. The gas turbine engine of claim 15, wherein the third elongate fastener is attached to the torque box at a location radially inward of the first and/or second elongate fasteners.

17. The gas turbine engine of claim 15, wherein the first direction is perpendicular to the second direction.

18. The gas turbine engine of claim 11, wherein the torque box includes a bell crank having at least a first end and a second end, wherein the bell crank is pivotally attached to the torque box at a pivot point located between the first end and the second end.

19. The gas turbine engine of claim 18, wherein the first end of the bell crank is attached to the linear actuator, and the second end of the bell crank is attached to linkages for communicating mechanical power to the variable guide vanes.

20. An actuator system comprising:
a torque box having components for communicating mechanical power to variable guide vanes for positioning; and
a linear actuator mechanically coupled to the components of the torque box used to communicate the provided mechanical power to the variable guide vanes to provide mechanical power in a direction parallel with an engine centerline axis, wherein the actuator is mounted directly to the torque box via a first elongate fastener extending in a first direction between a first hole in the actuator and a second hole in the torque box and a second elongate fastener extending in a second direction that is different from the first direction between a third hole in the actuator and a fourth hole in the torque box.

* * * * *